(12) United States Patent
Dawes et al.

(10) Patent No.: US 11,123,738 B2
(45) Date of Patent: Sep. 21, 2021

(54) HIGH PRESSURE SEAL CONNECTOR

(71) Applicant: EPREP PTY LTD, Ringwood (AU)

(72) Inventors: Ernest Frederick Dawes, Ringwood (AU); Peter Alexander Dawes, Ringwood (AU)

(73) Assignee: EPREP PTY LTD, Ringwood (AU)

(*) Notice: Subject to any disclaimer, the term of this patent is extended or adjusted under 35 U.S.C. 154(b) by 502 days.

(21) Appl. No.: 15/935,639

(22) Filed: Mar. 26, 2018

(65) Prior Publication Data

US 2018/0280980 A1    Oct. 4, 2018

Related U.S. Application Data

(63) Continuation of application No. 14/776,438, filed as application No. PCT/AU2014/000242 on Mar. 12, 2014, now abandoned.

(30) Foreign Application Priority Data

Mar. 12, 2013  (AU) ................... 2013900839
Sep. 23, 2013  (AU) ................... 2013903657

(51) Int. Cl.
*B01L 99/00*   (2010.01)
*B01L 3/00*    (2006.01)
(Continued)

(52) U.S. Cl.
CPC ....... *B01L 3/5635* (2013.01); *B01L 2200/025* (2013.01); *B01L 2200/026* (2013.01);
(Continued)

(58) Field of Classification Search
CPC ............. B01L 3/563; B01L 2300/041; B01L 2200/0689
(Continued)

(56) References Cited

U.S. PATENT DOCUMENTS

| 3,996,017 A | 12/1976 | Kaiser |
| 4,732,672 A | 3/1988 | Kiang et al. |
| 5,312,377 A * | 5/1994 | Dalton ................. A61M 39/10 |
| | | 285/331 |

FOREIGN PATENT DOCUMENTS

| CA | 1306199 C | 8/1992 |
| EP | 0017408 A1 | 10/1980 |

(Continued)

OTHER PUBLICATIONS

International Search Report dated Apr. 4, 2014 corresponding International Patent Application PCT/AU2014/000242.
(Continued)

*Primary Examiner* — Natalia Levkovich
(74) *Attorney, Agent, or Firm* — David D. Brush; Westman, Champlin & Koehler, P.A.

(57) ABSTRACT

Apparatus for making a fluid flow connection includes a pair of complementary components having respective first and second flow passages, and respective formations engageable to join the components by press-fitting them together so that the passages are in fluid flow communication and the junction between them is sealed against leakage up to a pre-determined pressure of the fluid flow. The respective formations comprise, on one hand, a spike (30) including at least a portion (32) of the first flow passage opening at a tip (31) of the spike and a first guide surface (29) about the spike, and, on the other hand, a body (41) with a passageway (42) that, when the components are press-fitted together, sealingly receives the spike, and a second guide surface (47) about the passageway that slidingly engages the first guide surface.

10 Claims, 11 Drawing Sheets

(51) Int. Cl.
*F16B 4/00* (2006.01)
*G01N 30/60* (2006.01)

(52) U.S. Cl.
CPC . *B01L 2200/0689* (2013.01); *B01L 2300/069* (2013.01); *B01L 2300/0681* (2013.01); *B01L 2300/089* (2013.01); *B01L 2400/0605* (2013.01); *F16B 4/004* (2013.01); *G01N 30/6026* (2013.01)

(58) Field of Classification Search
USPC .................................................. 422/546, 544
See application file for complete search history.

(56) References Cited

FOREIGN PATENT DOCUMENTS

| EP | 1750125 B1 | 4/2011 |
|----|------------|--------|
| WO | 1992004958 A1 | 4/1992 |
| WO | 1999036722 A1 | 7/1999 |
| WO | 2004109177 A2 | 12/2004 |
| WO | 2013053023 A1 | 4/2013 |

OTHER PUBLICATIONS

Written Opinion of the International Searching Authority dated Sep. 12, 2015 for corresponding International Application No. PCT/AU2014/000242, filed Mar. 12, 2014.

\* cited by examiner

HIGH PRESSURE SEAL CONNECTOR

CROSS-REFERENCE TO RELATED APPLICATIONS

This Application is Continuation and claims the benefit of U.S. application Ser. No. 14/776,438, filed Sep. 14, 2015, which is a Section 371 National Stage Application of International Application No. PCT/AU2014/000242, filed Mar. 12, 2014, published as WO 2014/138785 A1 on Sep. 18, 2014, in English, which is based on and claims the benefit of Australian Patent Application No. 2013900839, filed Mar. 12, 2013, and Australian Patent Application No. 2013903657, filed Sep. 23, 2013; the contents of which are hereby incorporated herein by reference in their entireties.

FIELD OF THE INVENTION

This invention relates generally to the connection of components, fittings and conduits in fluid handling equipment, but is especially useful for making fluid-tight connections in small-scale fluid handling applications, for example in precision analysis systems. The invention more particularly provides apparatus for making a fluid flow connection.

BACKGROUND OF THE INVENTION

In analytical chemistry there are a range of sophisticated techniques available such as chromatography, mass spectrometry and other spectroscopy techniques but rarely can a raw sample be introduced directly into the instrument. Some modification of the sample is usually required, for example removal of interfering matrix, elimination of components that will interfere in the analysis, concentration of the sample, or switching the matrix or solution in which the sample components of interest are dissolved.

There are a variety of techniques involved in sample preparation but amongst the most common are filtering, targeted pre-separation to simplify the sample, concentration of the sample and changing the matrix. It has been reported that 40% of all analytical sample preparation requires Solid Phase Extraction (SPE) and 60% of all analytical sample preparation requires sample filtering during the procedure.

Syringes are used in many areas of laboratories including sample preparation for instrumental analysis. Fundamentally a syringe fulfils a dual role as a pump for displacing fluids and as a metering device for accurately determining the precise volume dispensed and the rate it is dispensed. Syringes are used manually by hand or motor driven for automated operation.

A simple precision connection between a syringe and a fitting is particularly important for applications where a syringe becomes an integral part of a micro analytical or biotech procedure. One such application is direct mass spectrometry injection where typically very low volumes and flow rates are used to aspirate sample from a syringe. These methods can often include fittings containing a separation medium (e.g. a micro solid phase extraction (SPE) separation bed) where analyte is preferentially eluted and loaded directly onto the mass spectrometer.

More generally, evolution of sample preparation, analytical methods and instruments has necessitated the development of a new generation of precision liquid handling devices. Automation has also imposed new requirements on liquid handling, particularly with fittings and elements connected to pipettes, syringes and pumps such as needles, filters and sample preparation tools. Automation of fluid handling systems can require the automated disconnection an reconnection of components in the flowpath.

The most common ways to securely connect syringes, fittings and tools to another element are luer locks and screwthreads. However, luer lock fittings have a number of short falls when used for precision flow and automated operations. These include the imprecise connecting surfaces requiring mechanical twisting on a thread to be able to generate sufficient force on the sealing faces to make a pressure tight seal. In addition, with a luer lock fitting there is significant dead volume between mating parts. A standard screwthread can be used for a wide range of connections, but also requires a turning motion to engage and disengage fittings. It will thus be appreciated that conventional connection processes typically require a twisting motion that adds complexity if automation is desired.

It is an object of the invention to provide an improved or at least alternative arrangement for making a fluid flow connection.

Reference to any prior art or background information in this specification is not, and should not be taken as, an acknowledgment or any form of suggestion that this prior art or background information forms part of the common general knowledge in Australia or any other jurisdiction; or that this prior art or background information could reasonably be expected to be ascertained, understood and regarded as relevant by a person skilled in the art.

SUMMARY OF THE INVENTION

The apparatus of the invention entails a co-operative combination of a spike and a surrounding guide surface on the one hand, and a receiver of the spike and a complementary guide surface on the other.

The invention accordingly provides an apparatus for making a fluid flow connection that includes a pair of complementary components having respective first and second flow passages, and respective formations engageable to join to the components by press-fitting them together so that the passages are in fluid flow communication and the junction between them is sealed against leakage up to a pre-determined pressure of the fluid flow. The respective formations comprise, on one hand, a spike including at least a portion of the first flow passage opening at a tip of the spike and a first guide surface about the spike, and, on the other hand, a body with a passageway that, when said components are press-fitting together, sealingly receives the spike, and a second guide surface about the passageway that slidingly engages the first guide surface.

There invention also provides a component for a connection apparatus, comprising a body, and a spike including at least a portion of a flow passage opening at the tip of the spike. The body defines a first guide surface about the spike, and the component is configured to be press-fitted with a complementary component having a body with a passageway that sealingly receives the spike and a second guide surface about the passageway that slidingly engages the first guide surface.

The invention still further provides a component for a connection apparatus, comprising a body with an open-ended passageway and a second guide surface about the passageway. The component is configured to be press-fitted with a complementary component having a spike that includes at least a portion of a fluid passage opening at the tip of the spike and that is sealingly received by said passageway, and further having a body that defines a first guide surface about the spike that slidingly engages the second guide surface.

Preferably, the first guide surface is an inner surface of a tube surrounding the spike, and the second guide surface is a cylindrical surface surrounding the passageway.

In one or more embodiments the spike, the passageway and the first and second guide surfaces are of respective uniform cross-section and are mutually co-axially arranged.

Advantageously, the passageway sealingly receives the spike in an interference fit.

The respective components are preferably integral components.

In an application of particular interest, at least one of the first and second passages, preferably the second, includes a medium selected to treat or modify fluid e.g. sample-containing fluid, flowing therethrough. The medium may be a sorbent bed selected to trap targeted compounds from the fluid as it passes through the sorbent bed, for subsequent recovery from the bed by an elution solvent. The at least one passage may be one of two flow paths that are configured in parallel. The other flow path may contain a one-way check valve.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS

The invention will now be further described, by way of example only, with reference to the accompanying drawings, in which.

DETAILED DESCRIPTION OF THE EMBODIMENTS

Figure 1:
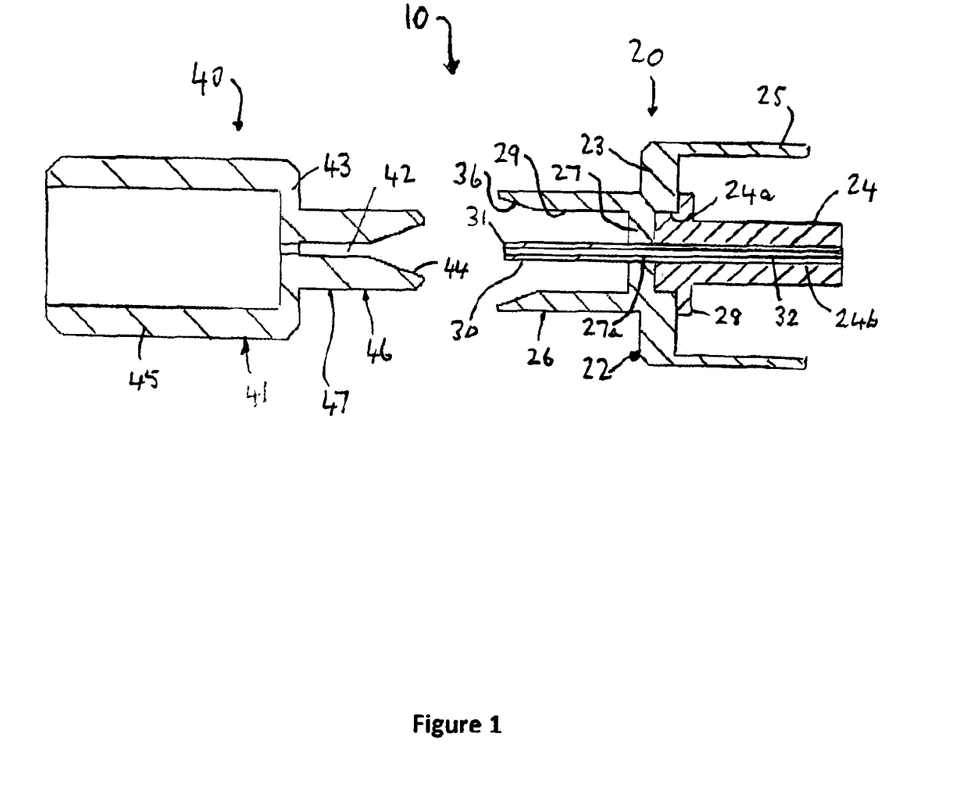
FIG. 1 is an axial cross-sectional view of the separated components of connection apparatus according to an embodiment of the invention, axially aligned but not joined.
Figure 2:
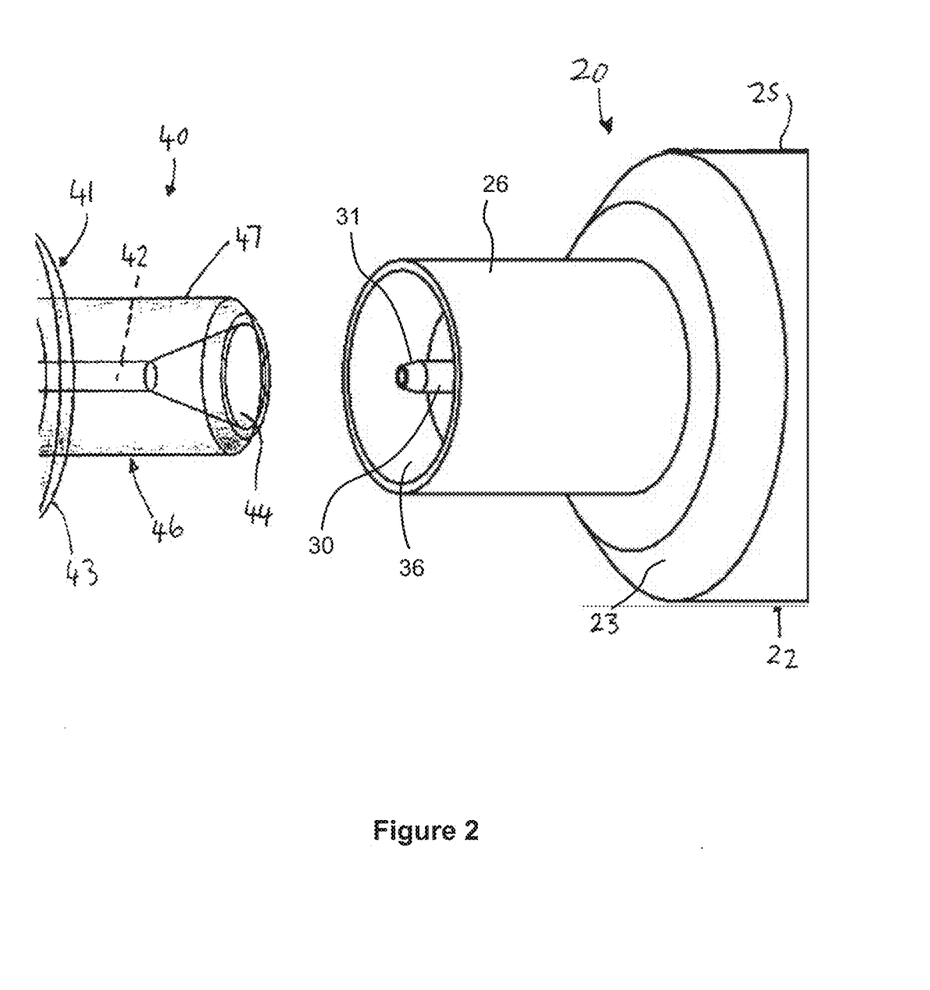
FIG. 2 is a fragmentary three-dimensional view of the two components.
Figure 3:
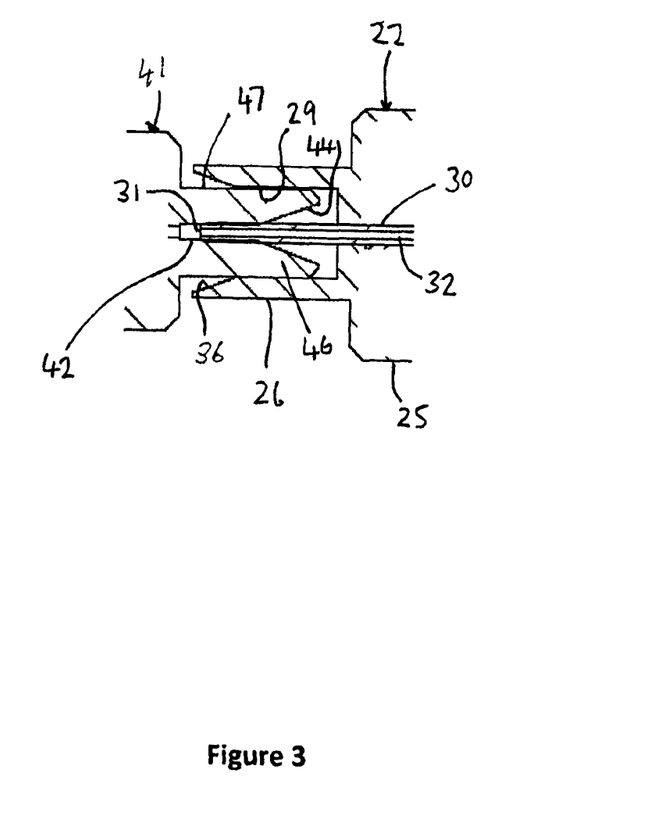
FIG. 3 is a view corresponding to FIG. 1 but showing the components fully coupled together to form a connection that is fluid type up to a predetermined pressure of the fluid flowing therethrough.

The connection apparatus 10 illustrated in FIGS. 1 to 3 includes a male component 20 and a female component 40. The male component 20 is, for this embodiment, especially adapted as an end-fitting for a positive displacement syringe and is illustrated in this context in FIGS. 4 and 5. The component 20 comprises a pair of axially symmetrical integrally moulded parts, i.e. a housing 22 and a rear central tube 24. Housing 22 includes a central annulus 23 that integrally joins a rearwardly trailing cylindrical skirt 25 of larger diameter and a forwardly projecting drive tube 26 of lesser diameter. The housing is strengthened by a transverse web 27 located at the forward side of annulus 23.

Annulus 23 and web 27 thereby define a central seat 24a for an enlarged head at one end of tube 24, which extends rearwardly, co-axially with skirt 25, to a slightly further extent than the skirt, and has a spacer rib 28 that abuts annulus 23. Housing 22 and tube 24 are secured together by a suitable adhesive.

The central bore 24b of tube 24 mounts a hollow spike 30 that is sealingly secured in the bore and extends from an inner end at the rear of tube 24 to an outer tip 31 just behind the forward edge of guide tube 26, passing through an aligned hole 27a, in web 27. The interior of spike 30 defines a first flow passage 32 that opens at the tip 31 of the spike, and the interior cylindrical surface of guide tube 26 defines a first guide surface 29 about the spike.

Figure 4:
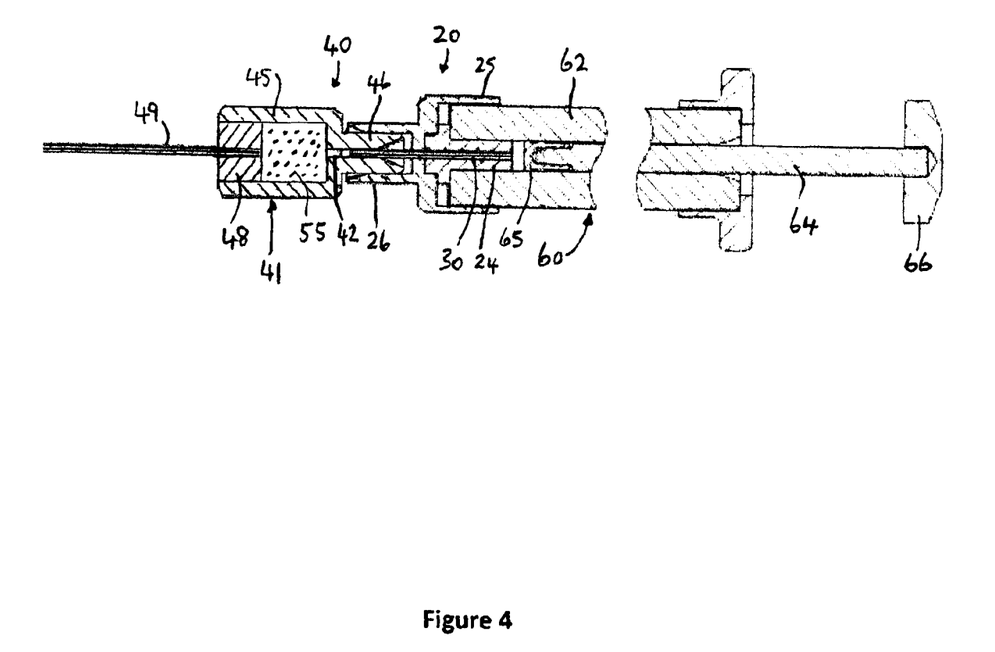
FIG. 4 is a view corresponding to FIG. 3 but depicting the apparatus connecting a syringe to a column or other flow line via a medium selected to treat or modify fluid flowing therethrough.

In a practical implementation, male component 20 is fitted, as shown in FIG. 4, as an end-fitting of a positive displacement syringe 60 having a barrel 62 and a plunger 64 slidably received in the barrel. The plunger 64 has a plunger tip 65 at its inner end and an engagement head 66 at its, outer end that may be gripped by hand or by any suitable mechanism for driving the plunger.

Female component 40 also has an integral moulded housing 41 that defines an annulus 43 integrally joining a cylindrical trailing skirt 45 of larger diameter and a forwardly projecting alignment guide tube 46 of smaller diameter. The outer cylindrical surface of alignment guide tube 46 defines a second guide surface 47 that is dimensioned to slidably engage the first guide surface 29 on guide tube 26 of the male component.

The hollow interior of alignment guide tube 46 provides a passageway 42 that, when the male and female components 20, 40 are press fitted together in an axial direction, sealingly receives spike 30, as illustrated in FIGS. 3 and 4. To facilitate engagement of the components, passageway 42 has a tapered entry 44 to receive spike 30, while first guide surface 29 includes tapered entry 36 to receive second guide surface 47.

Suitable materials for the male and female components 20, 40 include polyether ether ketone (PEEK), polytetrafluoroethylene (PTFE) (Teflon), nylon, polypropylene and polyethylene. It is found that the female component 40 is preferably formed in a softer material than the male component 20 in order to achieve optimum sealing properties.

By accurately dimensioning the diameter and uniformity of passageway 42 relative to the spike so that the passageway receives the spike in a substantially precise interference fit, it is possible to achieve a high sealing pressure rating for the combination and a low dead volume. It will be appreciated that the arrangement of the illustrated embodiment exposes only a very small surface area to the fluid flow path. Fluid pressure can be very high but is only applied to the annular area of the spike, which for example in the case of a 0.5 mm diameter spike is 0.20 mm$^2$. At a pressure of 70 kg/cm$^2$ (1,000 psi), the applied load pushing the connection apart is only 0.14 kg. It is found that this is insufficient force to overcome the friction from the interference fit between the hollow spike 32 and the diameter of passageway 42. The cross-sectional area of the fluid path can potentially hold pressures greater than 1,000 psi, and even up to and greater than 1,500 psi.

It will be appreciated that a good and accurate match between the diameters of guide surfaces 29, 47 is valuable in the seamless engagement of the components.

The inventive concept can be incorporated into a broad range of applications and fittings. Termination of elements such as syringes, pumps, needles, analytical columns, filter cartridges, SPE cartridges, sample preparation cartridges, manifolds, injector connections, detector connections, direct mass spectrometer interfaces, automated pick up and drop off, robotic fluid connections and so on can readily incorporate a connection apparatus according to the invention.

FIG. 4 illustrates the application of the invention where the male component is mounted as an end-fitting for a syringe, as already described, and the female component serves as a micro solid phase extraction (SPE) cartridge. A rear ferrule 48 adhesively secured within housing skirt 45 sealingly mounts an appropriate length of hollow column or tubing 49. The solid phase medium 55 occupies the volume between ferrule 48 and housing annulus 43 and is thus provided in the flow passage defined within the female component 40. The arrangement illustrated in FIG. 4 has proven effective for high pressure connections of a positive displacement syringe with a 5 micron ODS microSPE cartridge. Accurate volumes of sample and solvent have been delivered without leakage or loss. Minimal dead volume effects were observed when using the illustrated configuration.

It will be understood that the illustrated arrangement has the significant advantage of a press fit and therefore no requirement for a rotary or twisting motion. It thus permits simple automated engagement and disengagement. The arrangement provides an ultra-low dead volume connection to enable full sample of delivery to and from the syringe with minimum cross-contamination. The connection is also suited for rapid robotic automation, allowing simple pick up and drop off without twisting or turning. There is minimal risk of failure on pick up or sealing of the connection.

Figure 5:
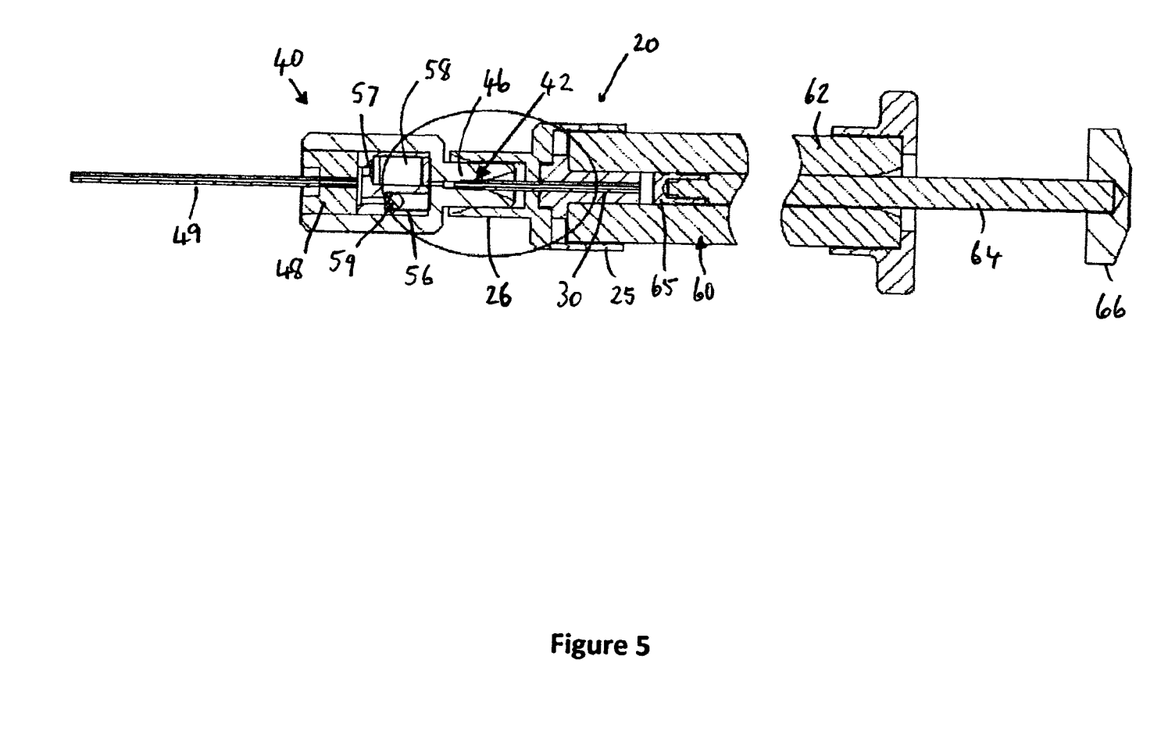
FIG. 5 illustrates a modification of the arrangement shown in FIG. 4.

FIG. 5 illustrates the application of the present invention in combination with a concept disclosed in international patent application PCT/AU2012/001291. The female component 40 has two flow paths 56, 57 that are configured in parallel and respectively contain a one-way check valve 59 and a medium 58 selected to treat or modify fluid flowing therethrough. The one-way check valve is depicted as a ball valve but may alternatively be, for example, a plug seal valve. In advantageous applications the medium 58 is a sorbent separation bed selected to trap targeted compounds from the fluid as it passes through the sorbent bed, for subsequent recovery from the bed by an [insert] solvent. In particular applications, the solvent separation bed may be a solid stationary phase bed for practising solid phase extraction (SPE) or micro extraction by packed solvent (MEPS) of the targeted compounds. The medium may be selected from the group comprising filtering media, monoliths and immobilised biologically active materials.

Figure 6:
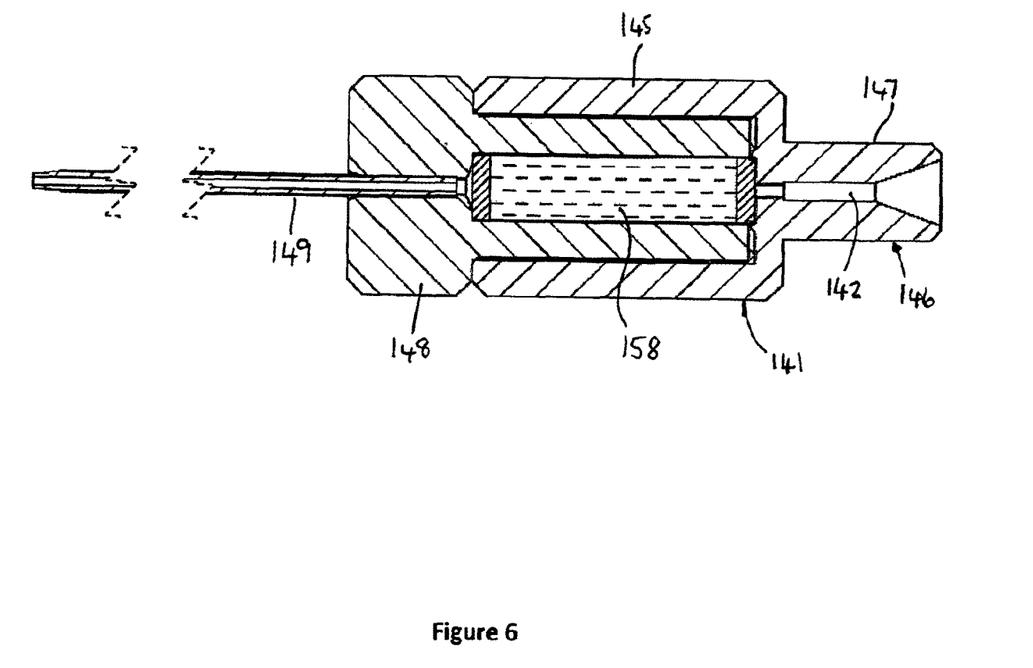
FIGS. 6 and 7 depict further alternative configurations for providing a separation bed respectively without and with a parallel valve.
Figure 7:
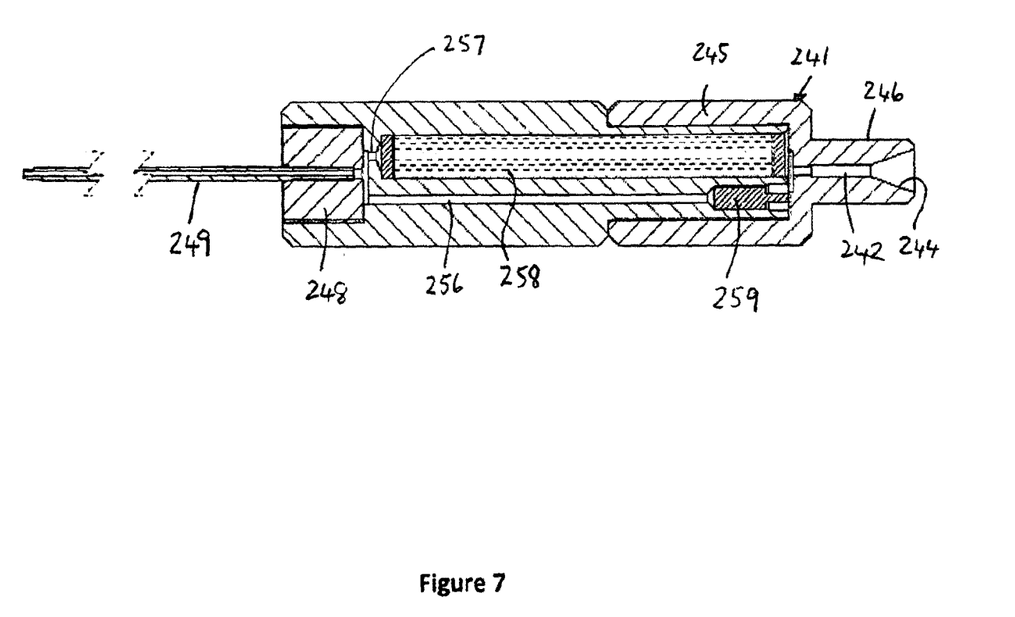

In the arrangement depicted in FIG. 5, the medium is a short separation bed 58 for micro SPE with a parallel valve 59. In FIG. 6 there is no valve but an extended separation bed 158, while in FIG. 7 there is a 'column' length separation bed 258 with a parallel one-way check valve 259. In FIGS. 6 and 7, like parts are indicated by like reference numerals preceded by a "1" and "2" respectively.

A particular operational advantage of the illustrated embodiments with a one-way check valve is that when the syringe plunger is retracted to aspirate fluid into the syringe, the reduced pressure in the syringe opens the valve and there is then sufficient restriction to flow through the medium bed to substantially prevent any flows through the bed when the valve is opened. On the other hand, once the fluid has been drawn into the syringe and the plunger is depressed, the check valve defaults to its closed position, assisted by the pressure generated in the syringe barrel by the back pressure due to restriction of flow through the media bed. With the valve closed, the dispensed fluid will flow only through the bed to exit through the needle of the syringe.

More extensive discussion of the embodiments of FIGS. 5 and 7 will be found in the aforementioned international patent application PCT/AU2012/001291, the entire contents of which is incorporated herein by a reference.

The inventive concept is ideal for robotic automation applications. Engagement and disengagement of the male and female components, without twisting or turning of parts, eliminates the need for complex automation apparatus, processes and programming. Simple push/pull fittings allow multiple fittings to be sequenced during a workflow operation with fittings being easily picked up and then dropped off using a simple fork device.

Figure 8:
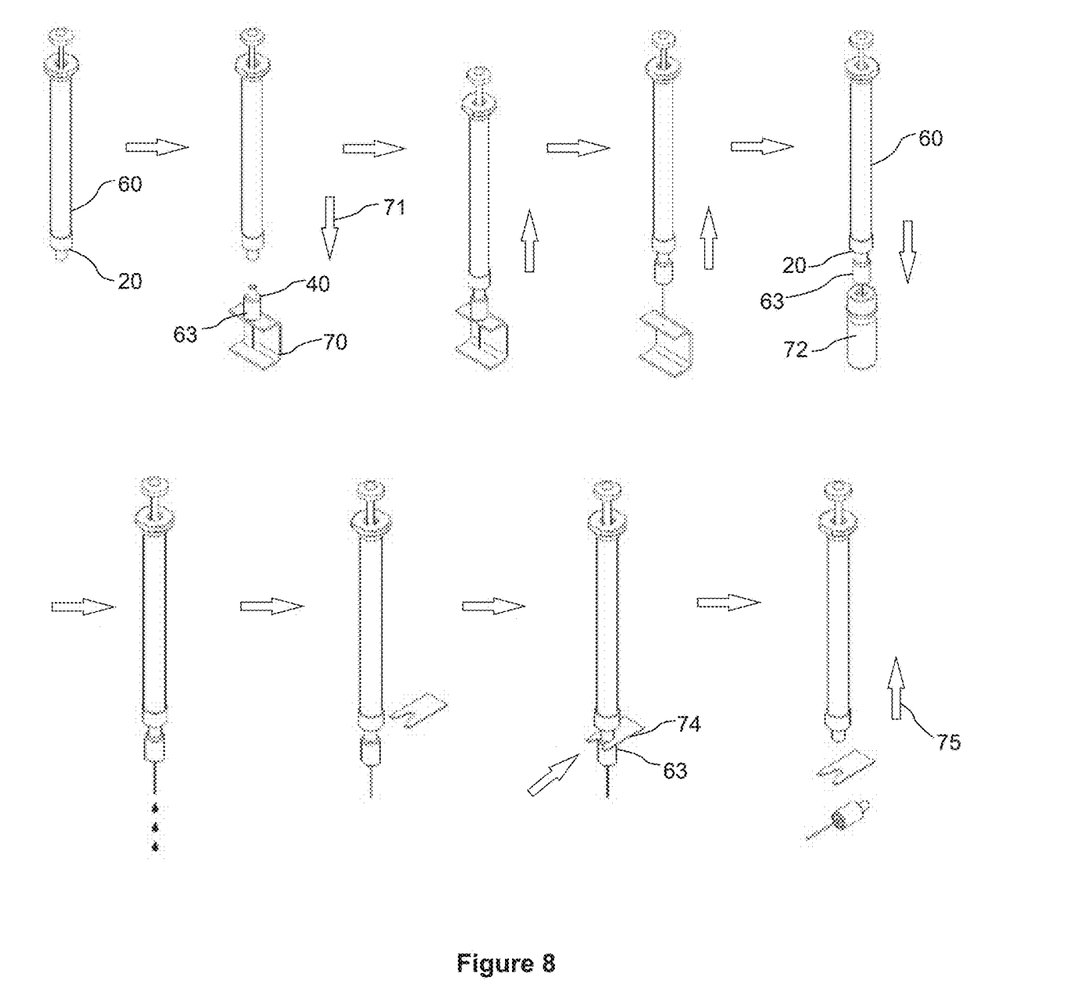
FIG. 8 is a diagram illustrating a sequence of operations in a robotic automation workflow employing apparatus according to FIGS. 1 to 3.

A typical automated sequence is illustrated in FIG. 8. The syringe 60 (fitted with the male component 20 illustrated in FIG. 1) picks up a micro SPE cartridge or filter 63 incorporating the female component 40 from a holder 70 with a push operation 71. The micro SPE is then used for processing the sample from a sample tube or other receptacle 72. When completed, a fixed fork 74 is used to expel the micro SPE cartridge 63 from the syringe using a pull operation 75. These sequences can be simply programmed into the workflow of most automated robotic systems. The process can be extended to using multiple fittings throughout a sample preparation workflow.

Figure 9:
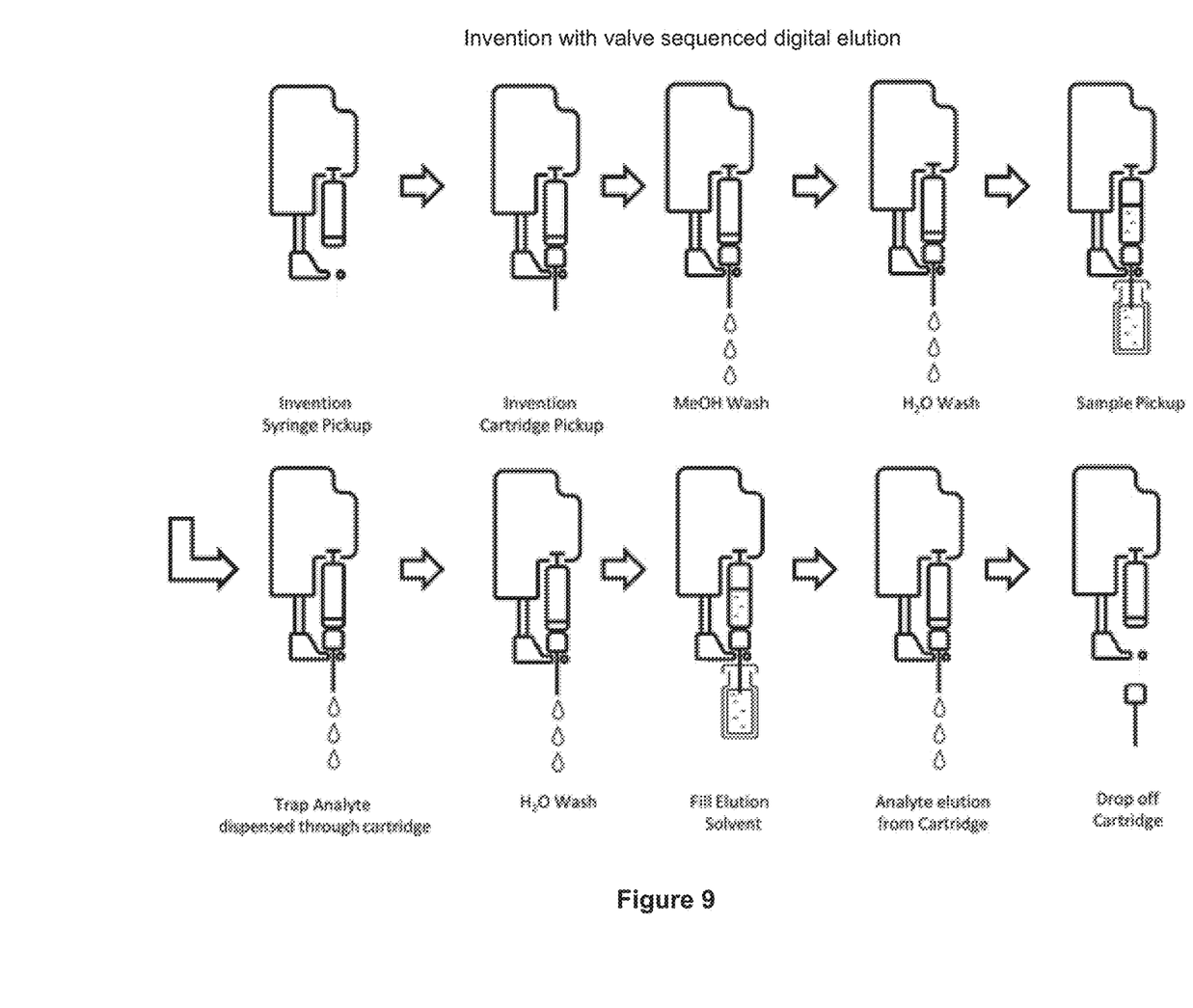
FIGS. 9 to 11 are diagrams of alternative robotic sequences.
Figure 10:
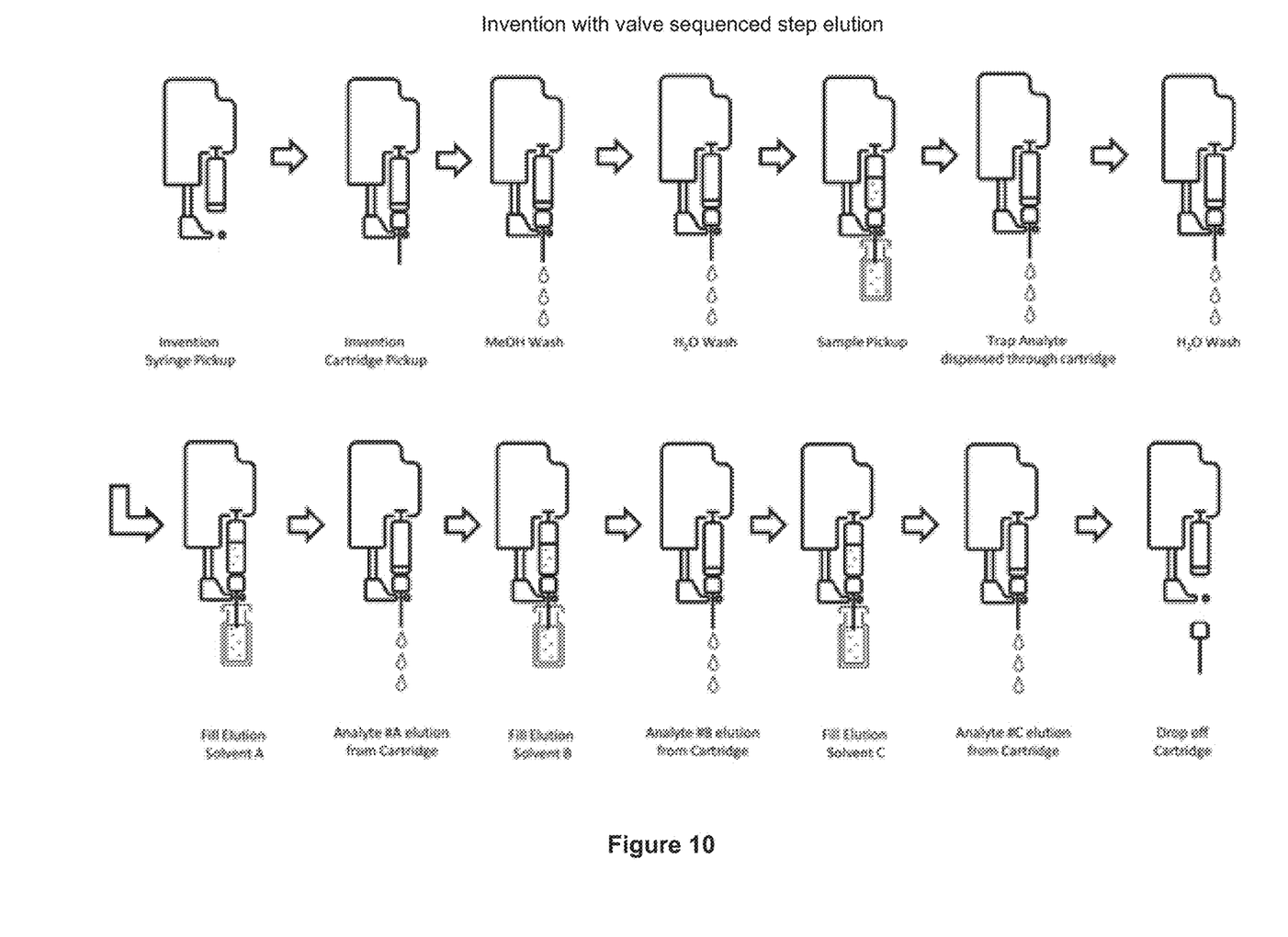
Figure 11:
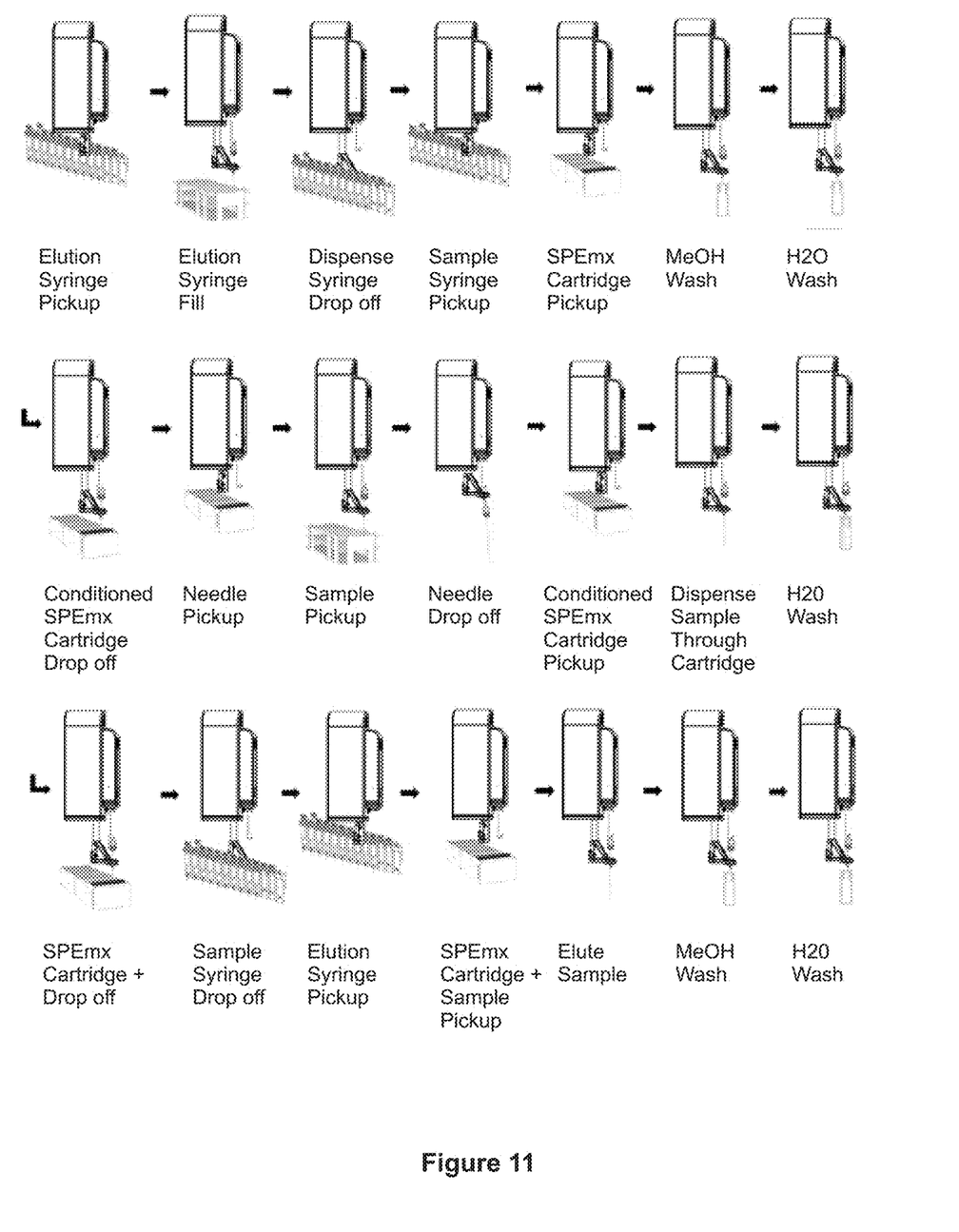

Further exemplary robotic sequences are illustrated in FIGS. 9 to 11.

The invention claimed is:

1. An apparatus for making a fluid flow connection, comprising:
   a pair of complementary components having respective first and second flow passages, the pair of complementary components configured to be mutually engageable by press-fitting them together so that said passages are in fluid flow communication,
   wherein:
   (i) one of the pair of complementary components comprises:
       (a) a hollow cylindrical spike including the first flow passage, the first flow passage opening at a tip of the spike, and
       (b) a guide tube being coaxial with the cylindrical spike, the guide tube having an inner surface forming a first cylindrical guide surface encircling and facing the cylindrical spike,
   (ii) the other of the pair of complimentary components comprises a spike receiving member having a cylindrical passageway extending therethough, the cylindrical passageway being in fluid communication with the second flow passage, the spike receiving member having a cylindrical outer surface forming a second guide surface,
   and wherein when said complementary components are press-fitted together, the cylindrical passageway sealingly receives the cylindrical spike so as to form an interference fit therebetween, and the second guide surface slidingly engages said first cylindrical guide surface.

2. The apparatus according to claim 1 wherein said inner surface includes a tapered entry thereof to receive the second guide surface.

3. The apparatus according to claim 1 wherein said spike, said passageway and said first and second guide surfaces are mutually co-axially arranged with respect to a longitudinal axis and are of respective uniform cross-section along a plane perpendicular to the longitudinal axis.

4. The apparatus according to claim 1 wherein said passageway has a tapered entry to receive the spike.

5. The apparatus according to claim 1 wherein at least one of said first and second flow passages includes a medium selected to treat or modify sample-containing fluid flowing therethrough.

6. The apparatus according to claim 5 wherein said medium is a sorbent bed selected to trap targeted compounds from said fluid as it passes through the sorbent bed, for subsequent recovery from the bed by an elution solvent.

7. The apparatus according to claim 5 wherein said at least one passage is one of two flow paths that are configured in parallel, and the other flow path contains a one-way check valve.

8. The apparatus according to claim 5 wherein said second flow passage includes said medium.

9. The apparatus of claim 1, wherein the first flow passage has a sufficiently small cross-sectional area such that the interference fit formed between the cylindrical pathway and the cylindrical spike is not disrupted under fluid pressure of about 1000 psi to about 1500 psi in the first and second flow passages.

10. The apparatus of claim 9, wherein the cross-sectional area of the first flow passage is less than the lumen of a standard male part of a Luer connection.

* * * * *